United States Patent
Porte et al.

(10) Patent No.: US 7,204,458 B2
(45) Date of Patent: Apr. 17, 2007

(54) CLOSING SYSTEM INTERPOSED BETWEEN TWO ELEMENTS

(75) Inventors: Alain Porte, Colomiers (FR); José Manuel Martin-Oquina, Toulouse (FR); Philippe Fourest, Merenvielle (FR)

(73) Assignee: Airbus France, Toulouse Cedex (FR)

( * ) Notice: Subject to any disclaimer, the term of this patent is extended or adjusted under 35 U.S.C. 154(b) by 0 days.

(21) Appl. No.: 10/366,793

(22) Filed: Feb. 13, 2003

(65) Prior Publication Data

US 2003/0151261 A1 Aug. 14, 2003

(30) Foreign Application Priority Data

Feb. 14, 2002 (FR) .................................. 02 01844

(51) Int. Cl.
*B64C 1/24* (2006.01)

(52) U.S. Cl. ..................................... 244/129.4; 292/113
(58) Field of Classification Search ........ 292/DIG. 14, 292/113, 247, DIG. 31; 244/129.4
See application file for complete search history.

(56) References Cited

U.S. PATENT DOCUMENTS

| | | | | |
|---|---|---|---|---|
| 2,800,346 A | * | 7/1957 | Manning | 292/113 |
| 3,347,578 A | * | 10/1967 | Sheehan et al. | 292/113 |
| 4,531,769 A | | 7/1985 | Glancy | 292/113 |
| 4,679,750 A | * | 7/1987 | Burhans | 244/129.4 |
| 4,936,611 A | * | 6/1990 | Palvolgyi | 292/28 |
| 5,046,689 A | * | 9/1991 | Shine | 244/129.4 |
| 5,138,753 A | | 8/1992 | Benjamin | 29/238 |
| 5,257,840 A | | 11/1993 | Rouzaud | 292/201 |
| 5,620,212 A | * | 4/1997 | Bourne et al. | 292/113 |
| 5,984,382 A | * | 11/1999 | Bourne et al. | 292/113 |
| 6,279,971 B1 | * | 8/2001 | Dessenberger, Jr. | 292/113 |
| 6,334,588 B1 | | 1/2002 | Porte | 244/129.4 |
| 6,445,421 B1 | * | 9/2002 | Pang et al. | 348/468 |

FOREIGN PATENT DOCUMENTS

| | | | |
|---|---|---|---|
| EP | 0 596 070 B1 | 5/1993 | |
| FR | 1 099 629 A1 | 11/2000 | |

* cited by examiner

*Primary Examiner*—Gary Estremsky
(74) *Attorney, Agent, or Firm*—Thelen Reid Brown Raysman Steiner LLP

(57) ABSTRACT

The invention relates to a closing system interposed between two elements that can occupy an open position and a closed position with respect to each other, the system comprising at least one main locking mechanism. The system according to the invention also comprises at least one emergency locking mechanism that is automatically engaged when the two elements are moved from the open position to the closed position, each emergency locking mechanism being able to be activated only when at least one main locking mechanism is not locked.

8 Claims, 6 Drawing Sheets

CLOSING SYSTEM INTERPOSED BETWEEN TWO ELEMENTS

This application claims priority to French Application No. 0201844 which was filed Feb. 14, 2002 and which was not published in English.

TECHNICAL FIELD

This invention relates to a closing system interposed between two elements that can occupy an open position and a closed position with respect to each other.

In particular, this type of system may be used between the cowls of an aircraft engine pod.

STATE OF PRIOR ART

Aircraft engine pods are usually equipped with cowls, which can be opened when the aircraft is on the ground to access different equipment, systems, etc., for maintenance. When the aircraft is in flight, the cowls are closed and their shape is such that they achieve aerodynamic continuity of the engine as a whole.

More precisely, the pod of a double flow turbojet is usually equipped with at least two cowls (a left cowl and a right cowl), placed around the engine fan. Each of the cowls has an approximately C-shaped section in a transverse plane perpendicular to the longitudinal axis of the engine. The top edge of each of the cowls is articulated to the top part of the engine through a hinge. With this arrangement, the different equipment in the engine can be accessed by lifting the cowls, particularly for maintenance purposes.

Furthermore, the lower edges of the cowls are equipped with a closing system comprising locking mechanisms designed to lock the cowls in their closed position when these mechanisms are activated. These locking mechanisms generally comprise a male part and a female part installed on the lower edges of each of the cowls, so that they can cooperate with each other when the cowls are closed.

In flight, several factors create a centrifugal force acting on the cowls. For example, there is the aerodynamic flow on the cowls, overpressures that may be caused by pipes bursting inside the engine, or the presence of ventilation devices.

Consequently, closing system locking mechanisms oppose this force in order to keep the cowls fixed to the engine. For safety reasons, a number of mechanisms greater than the number of mechanisms necessary to transfer forces generated by this centrifugal force are usually provided.

Document U.S. Pat. No. 4,531,769 relates to an improved locking mechanism designed for closing two cowls surrounding an aircraft engine. This quick fastening type mechanism comprises a main hook articulated on the lower edge of a first cowl so that it can penetrate into a complementary opening connected to the other cowl. The position of the main hook is protected by the use of a second hook. The mechanism is locked by pressing on a handle.

When this type of locking mechanism is installed in an aircraft engine, the operator responsible for closing the cowls can forget to lock it, or it may be badly locked. When a locking mechanism like that described in document U.S. Pat. No. 4,531,769 is used, the handle can be moved in the closing direction even if the hook is not engaged in the complementary opening fixed to the other cowl. In this case, in the same way as if the operator forgets to use the locking mechanisms after lowering the cowls, it is almost impossible to see that locking has been forgotten or has been done improperly. Due to their high mass, the cowls automatically come into place by gravity and their lower edges hardly project beyond the air intake. Furthermore, existing locking mechanisms do not have any genuinely projecting parts to inform the operator that there is a closing fault.

Document EP-A-0 596 070 describes a solution to this problem by installing a pivoting or sliding arm on the lower edge of one of these two cowls, that hangs visibly under the engine when the two cowls are lowered but not locked. The indication of a closing fault can be further improved by adding a fan at the end of the pivoting or sliding arm.

According to this document EP-A-0 596 070, the cowls can only be locked after the operator has manually reinstalled the arm to fit it onto a receptacle provided for this purpose. When locking is done, a pin connected to the opposite cowl penetrates into the arm to hold it in its extended position. When the cowls are unlocked, a spring automatically returns the arm into its projecting position visible from the outside.

However, there is a number of disadvantages with this indicator.

Firstly, in the most frequent case in which the engine is installed under the aircraft wing, the cowl closing system is located under the engine and therefore in a place very close to the ground with difficult access. When the operator opens or closes the cowls, he must crouch down to maneuver the locking mechanism forming the closing system. The arm added to the closing system according to document EP-A-0 596 070 then forms a projecting part in addition to other blunt edges of the engine that could injure the operator.

Furthermore, when the cowls are closed, the indicator described in document EP-A-0 596 070 obliges the operator to lift the arm while locking the cowls. This operation is particularly difficult and tedious to carry out in the position that the operator needs to occupy.

Furthermore, the indicator described in document EP-A-0 596 070 significantly complicates existing closing systems, since the pin that locks the arm in the extended position has to be aligned with the hole formed in the arm into which this pin fits. This operation may prove to be difficult, considering the wear and clearance of the parts during use.

Furthermore, when one of the locking mechanisms is being unlocked, the indicator described in document EP-A-0 596 070 is no longer capable of indicating the presence of a closing fault on the other locking mechanisms forming the closing system.

However, in flight, it is usually necessary to provide several locking mechanisms to keep the cowls in position with respect to each other and prevent them from being torn off the engine.

In the document mentioned above, only one of the closing system locking mechanisms needs to be actuated to prevent the indicator from warning that there is a closing fault, without considering the state of all the other mechanisms. Therefore, this is a major disadvantage in that situations can arrive in which personnel on the ground are not notified that locking is not sufficient to hold the cowls in position with respect to each other, for example when the aircraft is in flight.

Document EP-A-1 099 629 describes a locking means closing fault indicator that comprises retractable stop means that can automatically keep the two cowls separated from each other when these cowls are moved from an open position to a closed position.

Although this indicator corrects the main disadvantages of the embodiment described in document EP-A-0 596 070, it still has one of the disadvantages of the means described in this document EP-A-0 596 070.

This disadvantage is due to the inability of the indicator to notify a closing fault on any one of the closing system locking mechanisms, when one of the locking mechanisms has already been locked. Once the indicator has been manually activated to enable closure of the locking means, this indicator is no longer capable of providing any information about the state of the different locking mechanisms.

Moreover, the indicators according to documents EP-A-0 596 070 and EP-A-1 099 629 systematically require human intervention. This necessity occurs both in fault detection and in closure of locking mechanisms and is liable to be omitted due to operator negligence.

To illustrate the possible consequences of human intervention, situations can arise in which the operator only locks one of the locking mechanisms forming the closing system, sometimes even imperfectly by placing the lock in the complementary opening without turning the handle to prevent the cowls rattling against each other, for example under the effect of wind.

In this case, the cowls in all embodiments according to prior art appear to be closed and locked, but the single activated mechanism is usually not sufficient to hold the cowls in place to each other during flight of the aircraft.

SUMMARY OF THE INVENTION

The purpose of this invention is to present a closing system interposed between two elements that can be in an open position or a closed position with respect to each other, this closing system comprising at least one main locking mechanism and at least partially correcting the disadvantages mentioned above related to embodiments according to prior art.

To achieve this, the purpose of the invention is a closing system interposed between two elements that can occupy an open position and a closed position with respect to each other, the system comprising at least one main locking mechanism. According to the invention, the system also comprises at least one emergency locking mechanism that is automatically engaged when the two elements are moved from the open position to the closed position, each emergency locking mechanism being able to be activated only when at least one main locking mechanism has not been locked.

Advantageously, when an operator moves the two elements from the open position to the closed position, each emergency locking mechanism is automatically engaged, without the need for any additional human intervention. The emergency locking mechanism(s) then assure safety if one or more of the main locking mechanisms are not activated.

When one of the main locking mechanisms is locked, each emergency locking mechanism is engaged but is not mechanically loaded. In this case, the emergency locking mechanisms do not participate in holding the elements together.

The emergency locking mechanism(s) will only replace the main locking mechanism when the main locking mechanisms are not active, to hold the elements together.

Preferably, each emergency locking mechanism may be loaded when the two elements tend to move from the closed position towards the open position.

Furthermore, each emergency locking mechanism may include a first and second complementary shaped part, installed on a first and second of the two elements respectively.

According to a preferred embodiment of the invention, the first part is fixed to the first of the two elements, and the second part is a lever hinged on the second of the two elements.

Furthermore, each second part is coupled to mechanical return means that hold an engagement between the first and the second parts.

It would also be possible to make the closing system comprise several emergency locking mechanisms and a main locking mechanism at each of the two lateral ends of the elements.

Finally, according to one particular application of this invention, the two elements are the cowls of an aircraft engine pod.

Other advantages and specificities of the invention will be described in the following non-limitative description.

BRIEF DESCRIPTION OF THE DRAWINGS

This description will be made with reference to the appended drawings, wherein.

DETAILED PRESENTATION OF A PREFERRED EMBODIMENT

Figure 1:
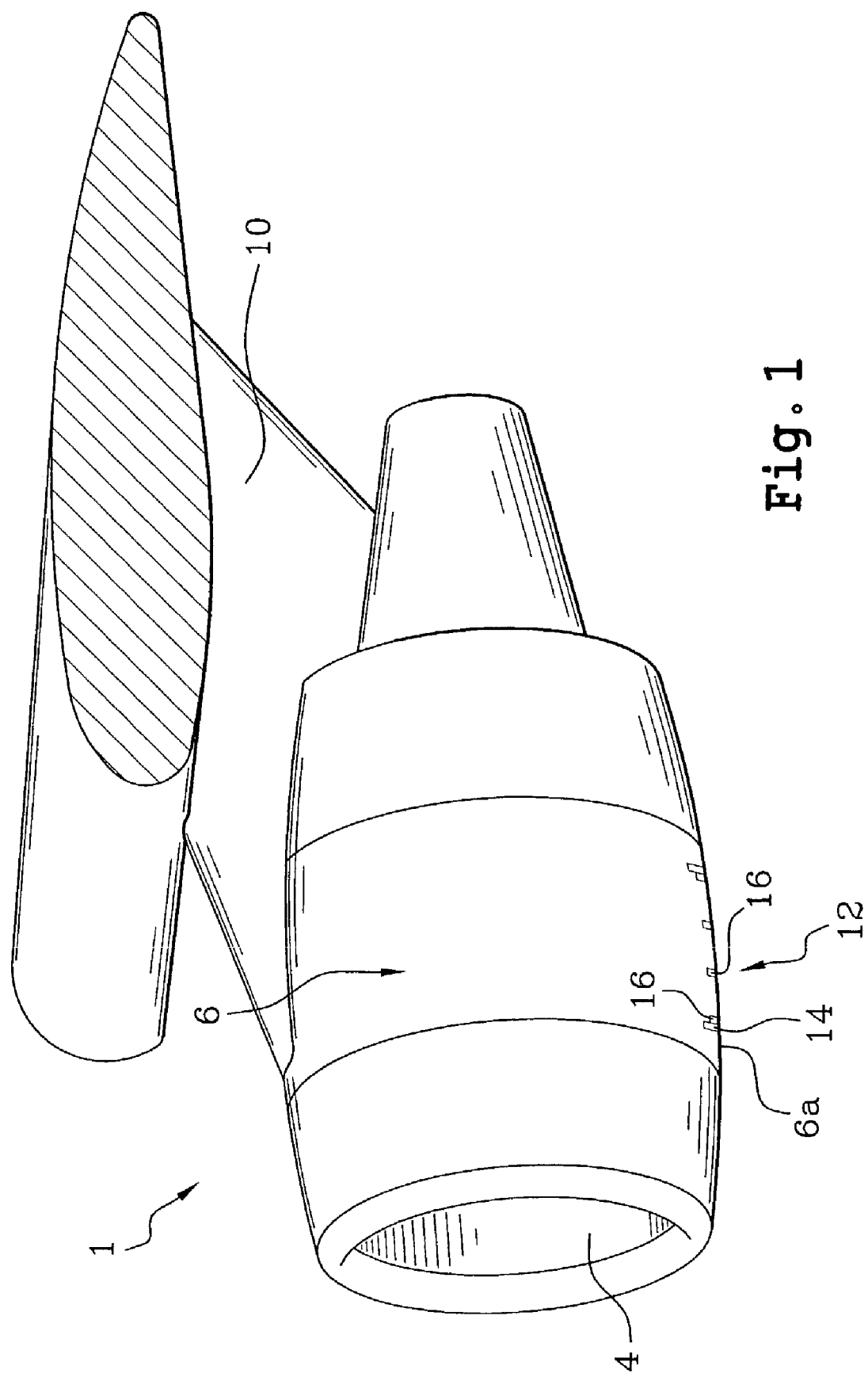
FIG. 1 represents a perspective diagrammatic view of a turbojet, the pod of which is fitted with a closing system according to the invention, with the pod cowls being in the closed position.

As can be seen in FIG. 1, a pod 1 of a turbojet is usually delimited on the inside by a fan casing 4 next to a fan (not shown). Furthermore, the pod 1 is also delimited towards the outside by two cowls 6 and 8 forming the left cowl and the right cowl respectively. The left cowl 6 and the right cowl 8 are each approximately in the shape of a C or a semi-circle, in a transverse section along a plane perpendicular to the longitudinal axis of the engine.

Cowls 6 and 8 are each articulated on a pylon 10 from which the engine is suspended, under a wing of the aircraft. More precisely, the top end of each of the cowls 6 and 8 is connected to the pylon 10, at a top part of the engine, by a hinge (not shown) which is along a line approximately parallel to the longitudinal centerline of the engine. This particular arrangement means that each of the cowls 6 and 8 can be raised to access the various engine equipment (not shown), traditionally located within an annular space (not shown) delimited on the inside of the pod 1 between the fan casing 4 and the left cowl 6 and the right cowl 8.

The left cowl 6 and the right cowl 8 are usually locked and held together by means of a closing system 12 comprising several locking mechanisms 14, 16, shown diagrammatically in FIG. 1.

The main locking mechanisms 14 can be seen among the locking mechanisms 14, 16 positioned between the two cowls 6 and 8 and forming the closing system 12. There is a sufficient number of these main locking mechanisms 14 to hold the cowls 6, 8 fixed together during flight.

Figure 2:
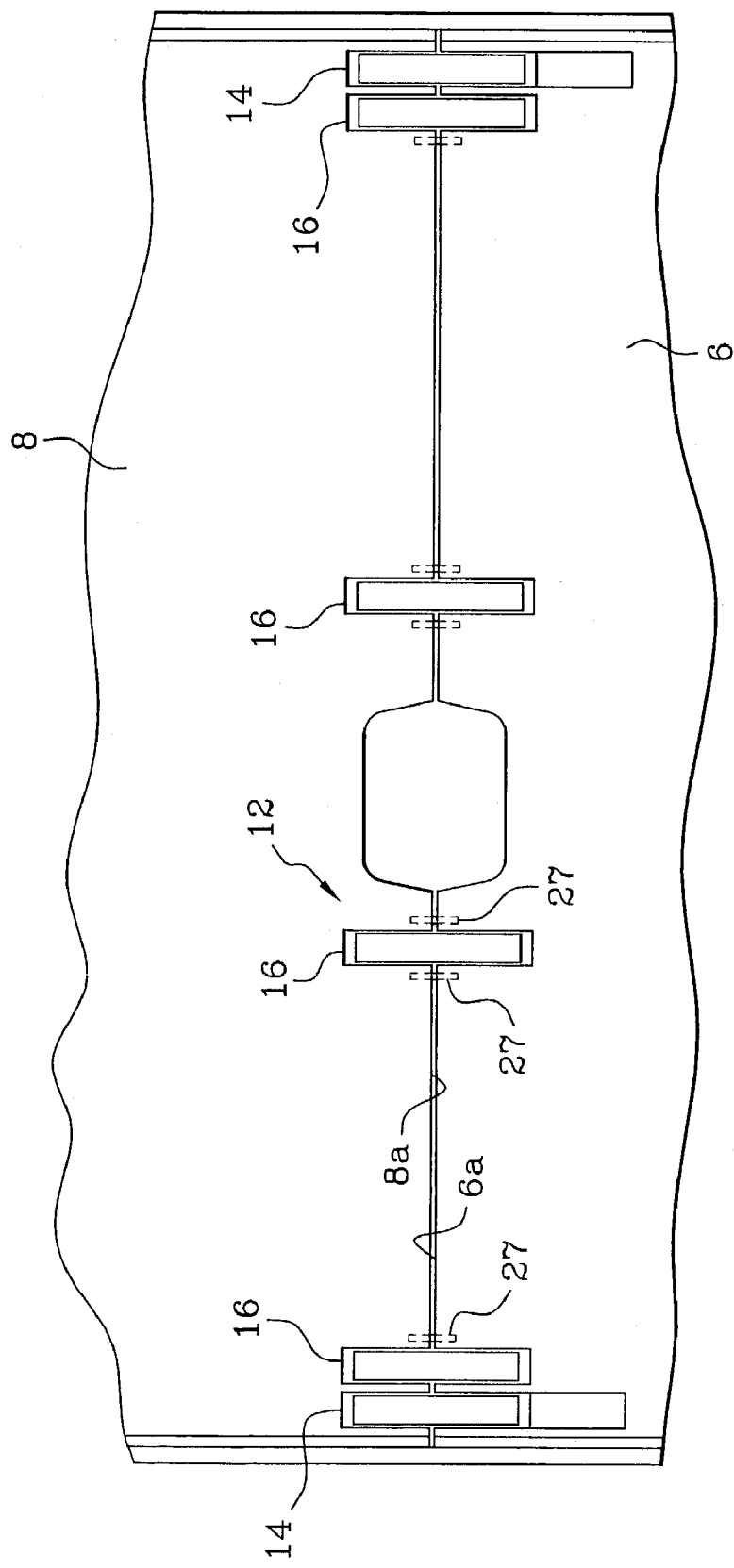
FIG. 2 shows a partial bottom view of the turbojet in FIG. 1.
Figure 3:
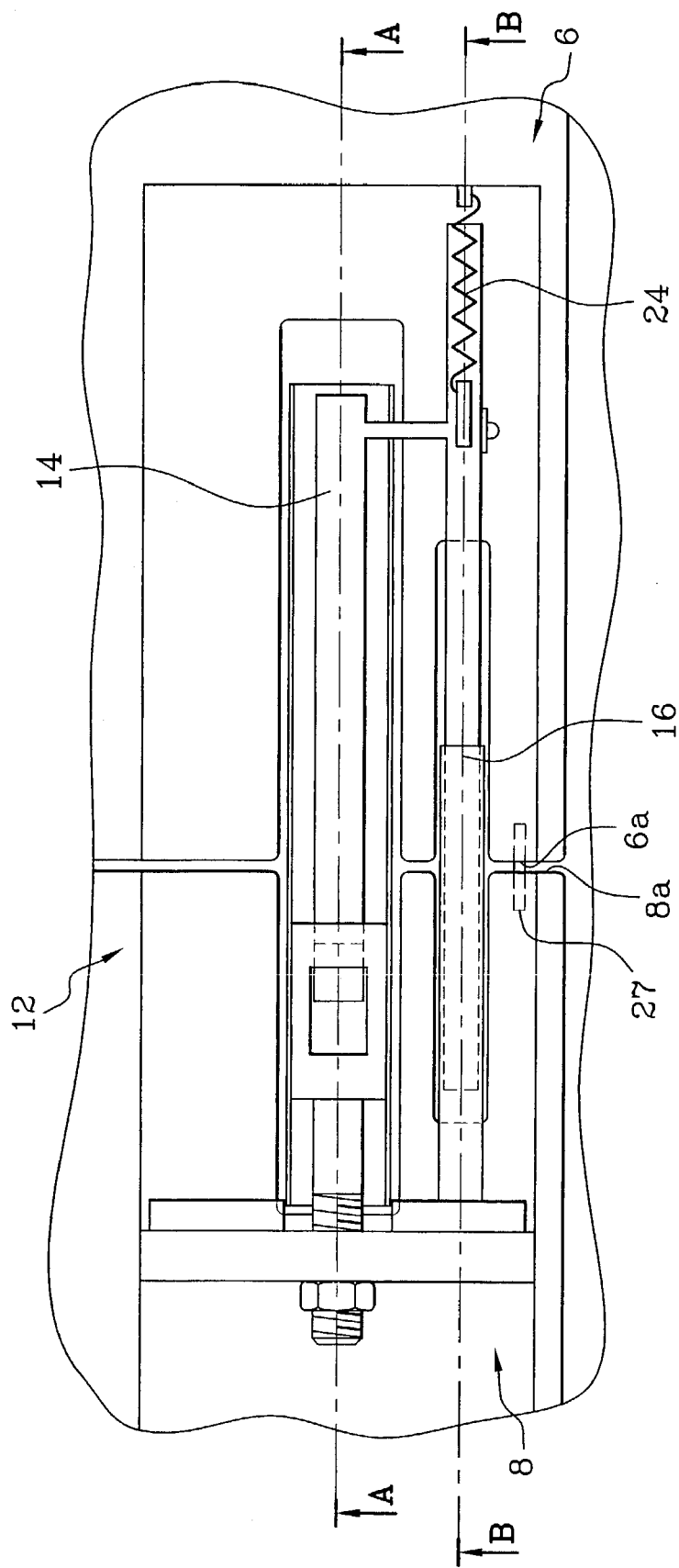
FIG. 3 shows a partial view of FIG. 2 at a larger scale, showing a main locking mechanism and an emergency locking mechanism.

According to one preferred embodiment of the invention and with reference to FIGS. 2 and 3, there is provided a closing system 12 interposed between two elements 6 and 8 formed by the left cowl 6 and the right cowl 8 of the pod 1.

The cowls 6 and 8 are each provided with a lower edge 6a, 8a, these lower edges 6a, 8a being located at the opposite end of the top edges connecting the left cowl 6 and the right cowl 8 to the pylon 10.

The closing system 12 comprises two main locking mechanisms 14, each connecting the lateral ends of the cowls 6 and 8 together in pairs. The preferred position for the main mechanisms 14 is justified by the relatively easy access to the lateral ends of the cowls for an operator who wants to lock or unlock these mechanisms 14. The closing system 12 also comprises at least one emergency locking mechanism 16. Preferably, and in the preferred embodiment described, the system 12 comprises four emergency locking mechanisms 16 which are located parallel to each other between the two main locking mechanisms 14, along a direction approximately orthogonal to the longitudinal center line of the engine. It is noted that the number of emergency locking mechanisms 16 is determined such that if any one or several of the main locking mechanisms 14 are not locked, the cowls 6 and 8 are still held to each other.

The main locking mechanisms 14 are preferably equipped with quick fastening mechanisms, this type of mechanism being used frequently between the two cowls of an engine pod.

Figure 4:
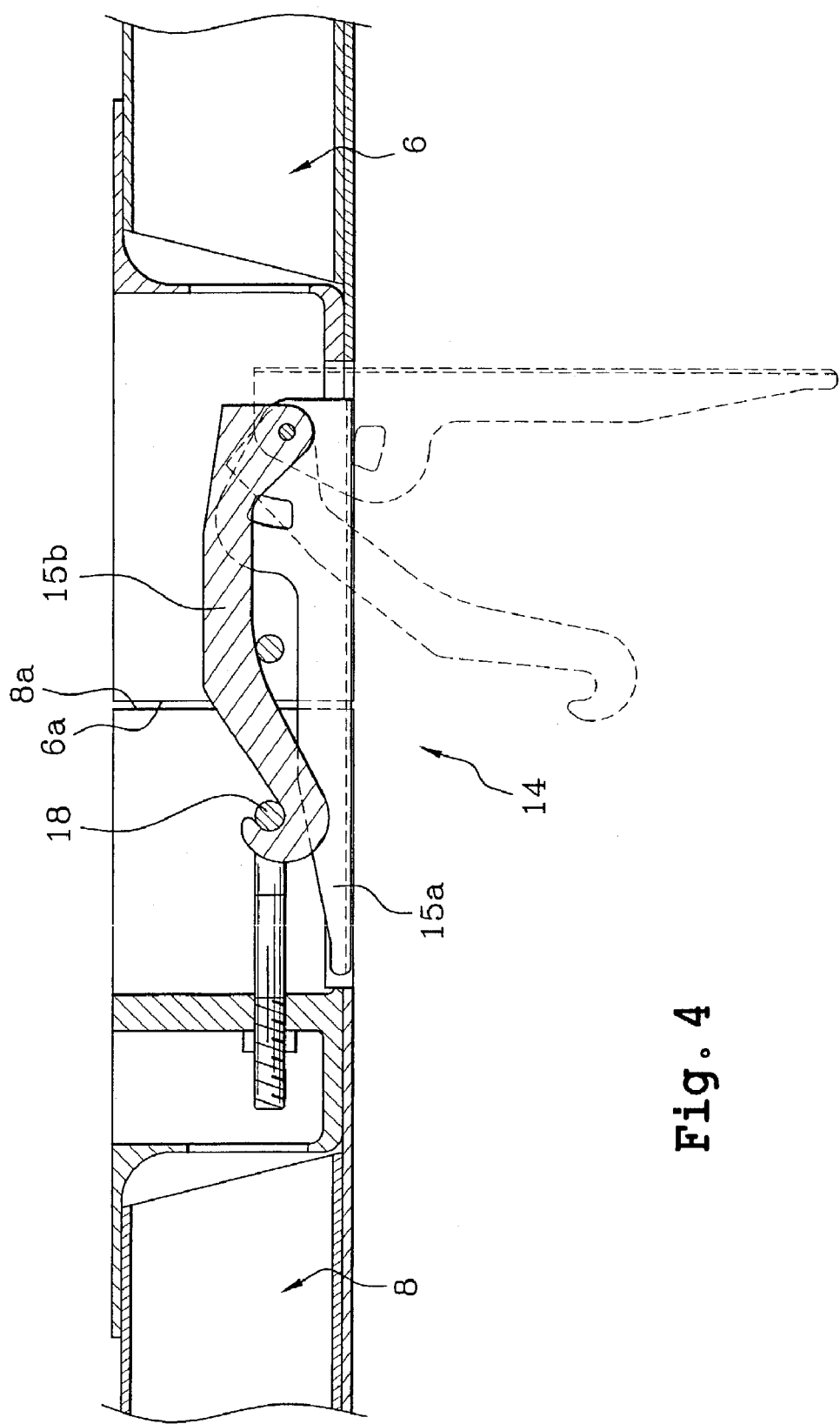
FIG. 4 shows a partial sectional view taken along line A—A in FIG. 3.

With reference to FIG. 4, the mechanism 14 comprises a handle 15a articulated on the left cowl 6 and carrying an articulated hook 15b. In this figure, the main locking mechanism 14 is shown in is locked configuration in solid lines, while it is shown in dashed lines in the inactivated configuration. When the mechanism 14 is in its locked position, the hook 15b cooperates with a mortise 18 located under the right cowl 8, thus holding the cowls 6 and 8 in position with respect to each other.

Figure 5:
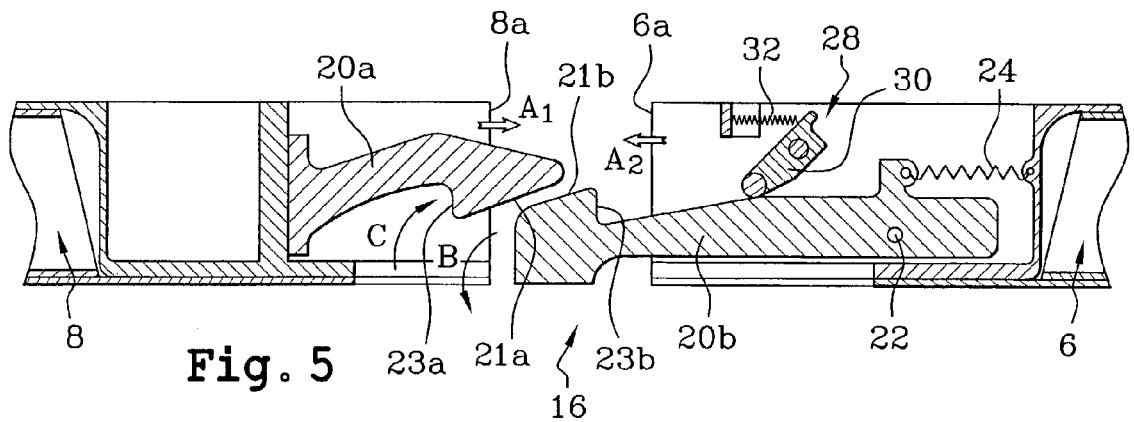
FIG. 5 shows a partial sectional view taken along line B—B in FIG. 3 when the pod cowls move from the open position to the closed position.

Furthermore, as can be seen in FIG. 5, each emergency locking mechanism 16 comprises a first part, preferably a hook 20a, and a second part, preferably a lever 20b, these parts having complementary shapes. The hook 20a and the lever 20b are installed fixed on the right cowl 8 and hinged through a hinge pin 22 approximately parallel to the longitudinal axis of the engine, on the left cowl 6.

The hook 20a and the lever 20b comprise inclined surface type ramps 21a and 21b, capable of controlling pivoting of the articulated lever 20b towards the outside when the cowls 6 and 8 move towards each other. Furthermore, the hook 20a and the lever 20b comprise attachment surfaces 23a and 23b respectively, parallel to the lower edges 6a, 8a of the cowls 6 and 8, and capable of coming into position with respect to each other when the cowls 6, 8 are closed.

Furthermore, the articulated lever 20b is connected to mechanical return means, preferably composed of a spring 24, the spring 24 also being connected to the left cowl 6.

For example, it is noted that the first part could also be composed of a lever articulated on the right cowl 8, or also a mortise with which the lever 20b might cooperate.

As shown in FIGS. 2 and 3, one or several guide pins 27 may be located close to each emergency locking mechanism 16, thus facilitating engagement between the hook 20a and the lever 20b of the mechanisms 16.

The closing system 12 can operate as follows.

When the two cowls 6 and 8 are in an open position (position not shown in the figures), they are separated from each other thus allowing the operator to carry out maintenance type work on the engine.

When the various operations to be carried out are finished, the cowls 6 and 8 are folded down to be fixed to each other. The left cowl 6 and the right cowl 8 then move from the open position to a closed position.

In the closed position, the lower edges 6a and 8a of the cowls 6 and 8 are separated by only a few millimeters, such that the operator can easily lock the two main mechanisms 14 by moving the hook 15b and then the lever 15a of these mechanisms 14.

However, it is possible that the cowls 6 and 8 are folded down in the closed position without the two main mechanisms 14 being locked. The operator can forget to lock one or all of the main mechanisms 14 forming part of the closing system 12. He may forget particularly in a situation in which the operator, having previously locked one of the main mechanisms 14 to prevent the cowls 6 and 8 from tapping against each other under the effect of wind, forgets to lock the other main mechanisms 14 of the closing system 12.

In this situation, there is no physical means of informing personnel on the ground about the closing fault of one of the main mechanisms 14 concerned. Since the main locking mechanisms 14 are located under the engine, a failure to activate one or several of these mechanisms 14 would be difficult to detect, thus causing a significant lack of safety during flight of the aircraft.

These are the reasons why the closing system 12 also comprises emergency locking mechanisms 16, which will automatically engage during displacement of the cowls 6, 8 from the open position to the closed position.

With reference to FIG. 5, the arrows $A_1$ and $A_2$ very diagrammatically symbolize the corresponding directions of the right cowl 8 and the left cowl 6 when they move, under the action of an operator and/or due to their own weight, from the open position to the closed position.

Before the cowls 6, 8 reach the closed position, the ramp 21b of the articulated lever 20b comes into contact with the ramp 21b of the hook 20a. Therefore, the lever 20b pivots around the axis 22 as the cowls 6 and 8 move towards each other. As already mentioned, the guide pins 27 provided close to the emergency locking mechanisms 16 ensure that the hook 20a is correctly positioned with respect to the lever 20b, such that when the cowls 6, 8 are closed, the ramps 21a and 21b come into contact with each other.

Pivoting of the articulated lever 20b represented by the arrow B pulls this lever 20b towards the outside of the pod 1. However, the spring 24 holds ramps 21a and 21b in contact. When the cowls 6 and 8 are in a position sufficiently close to the closed position so that lever 20b and hook 20a are no longer in contact and are engaged, the articulated lever 20b pivots around the axis 22 again, in the reverse direction shown diagrammatically by arrow C, under the effect of the spring 24 that retracts and returns to its initial shape.

Figure 6:
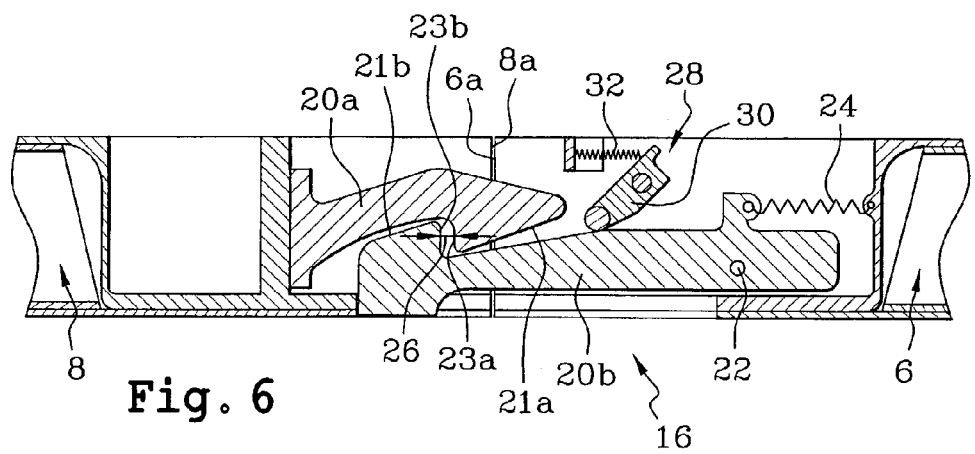
FIG. 6 shows a partial sectional view taken along line B—B in FIG. 3, when the emergency locking mechanisms are engaged but not loaded.

FIG. 6 shows the emergency locking mechanism 16 in an engaged configuration when the cowls 6 and 8 are in the closed position. The hook 20a and the articulated lever 20b are no longer in contact with each other. In particular, it can be seen in this figure that when the main locking mechanisms 14 are activated and consequently are holding the cowls 6 and 8 in the closed position, there is a clearance 26 between the fastening surfaces 23a and 23b of the hook 20a and the articulated lever 20b. The clearance, in a direction approximately circumferential with respect to the longitudinal axis of the engine, indicates that the emergency locking mechanism has been engaged, but is not mechanically loaded. Therefore, all forces to hold the cowls 6 and 8 together are normally resisted by the main locking mechanisms 14, when they are locked.

Figure 7:
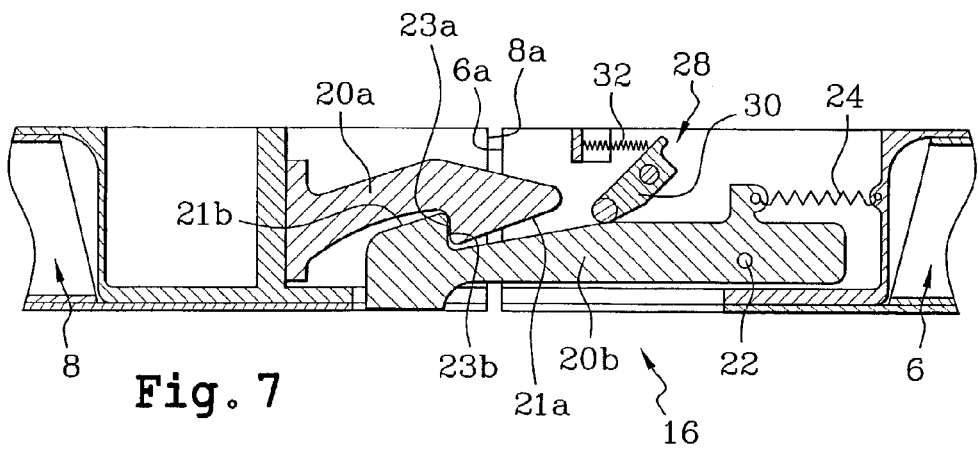
FIG. 7 shows a partial sectional view taken along line B—B in FIG. 3, when the emergency locking mechanisms are engaged and loaded.

On the other hand, when there is a locking fault in one or more of the main locking mechanisms 14, specific conditions encountered particularly in a flight situation create a centrifugal force that forces the cowls 6 and 8 from the closed position towards the open position. In this case, the clearance 26 between the hook 20a and the lever 20b is reduced as the cowls 6 and 8 move away from each other under the effect of the centrifugal force, until they reach a position (shown in FIG. 7) in which the attachment surfaces 23a, 23b of the hook 20a and the lever 20b come into contact to stop the relative movement between the right cowl 8 and the left cowl 6.

Thus, when the main locking mechanism(s) 14 is (are) not locked, the emergency locking mechanisms 16 can substitute for these main mechanisms 14, to hold the cowls 6 and 8 together. It is also noted that the emergency locking mechanisms 16 can also be useful when there is a failure in the main mechanisms 14, for example this failure can occur during an aircraft flight. This arrangement is particularly advantageous because it is no longer necessary to an excess number of main mechanisms 14 forming the closing system 12, since if these mechanisms 14 should fail, the number of emergency locking mechanisms 16 provided is sufficient to resist the centrifugal force exerted during flight and to hold the cowls 6 and 8 together. Consequently, the number of main mechanisms 14 forming the closing system 12 can be considerably reduced.

Furthermore, when the emergency mechanisms 16 are loaded, the centering pins 27 located close to these mechanisms 16 may also resist forces applied in a direction perpendicular to the longitudinal axis of the engine.

Note that the operation consisting of moving the cowls 6 and 8 from a closed position to an open position is done by unlocking the main mechanisms 14 if they were previously locked, and also activating separation means 28 coupled to each of the emergency locking mechanisms 16.

When the disengagement means 28 are activated, they pivot the articulated lever 20b, thus releasing the two cowls 6, 8 from each other. In particular, they may comprise an articulated arm 30 controlled by a maneuver device (not shown) and returned by a spring 32.

To move the cowls 6 and 8 from a closed position to an open position, it is possible to provide the handle 15a with a locking mechanism 14, firstly to control opening and closing of this mechanism 14, but also to activate means 28 of disengaging one or several emergency locking means 16.

Figure 8:
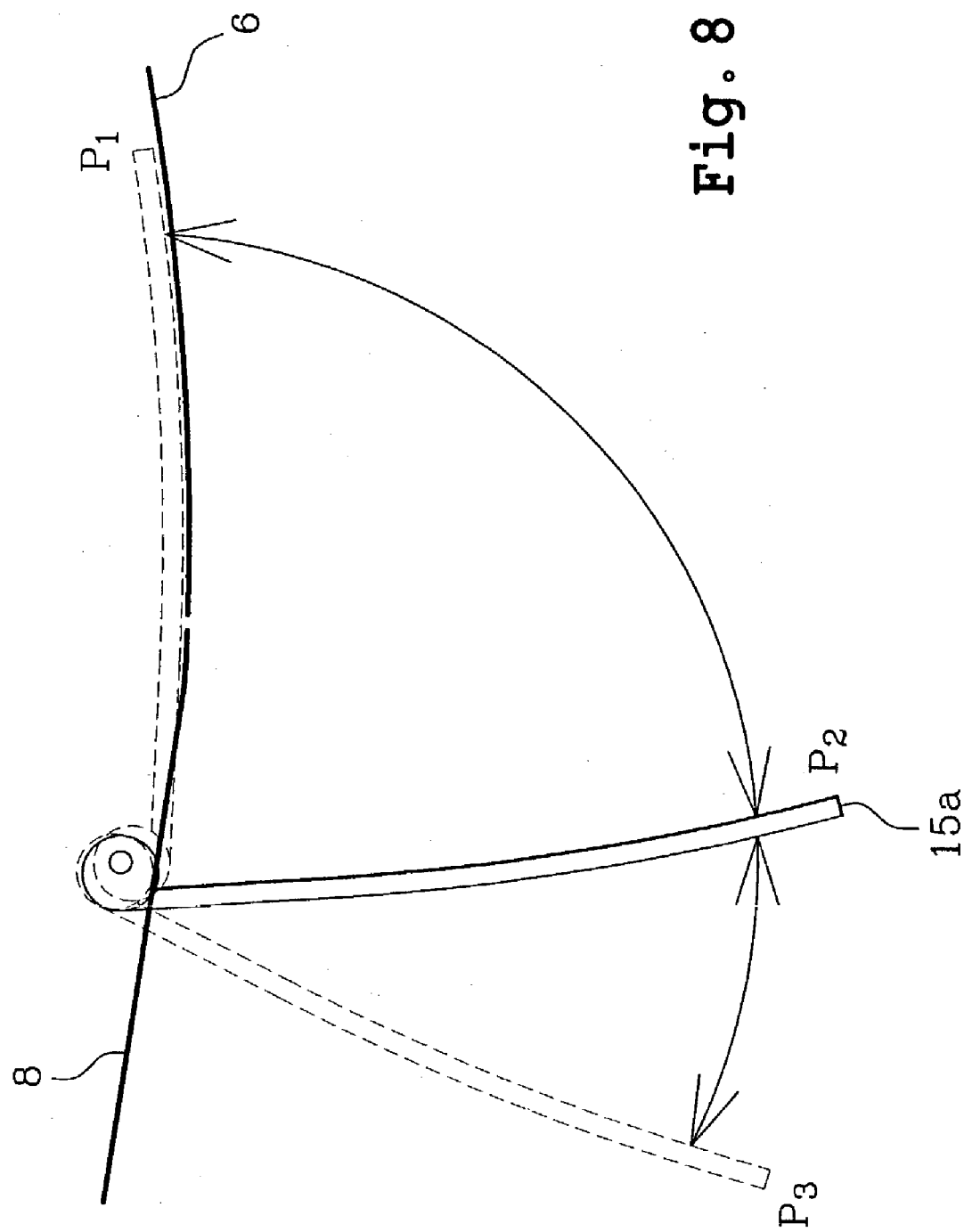
FIG. 8 shows a diagrammatic sectional view of a handle of a main locking mechanism belonging to a closing system according to a preferred embodiment of the invention.

In this case, as illustrated very diagrammatically in FIG. 8, the handle 15a of the main mechanism 14 can then be in three distinct positions, referenced $P_1$, $P_2$ and $P_3$ respectively.

In position $P_1$, the handle 15a is folded down in contact with the left cowl 6, indicating that the two cowls 6 and 8 are closed and locked.

When the handle 15a is moved from position $P_1$ to position $P_2$, the movement of this handle 15a unlocks the main mechanism 14. However, the cowls 6 and 8 are still closed, particularly due to the presence of the emergency locking mechanisms 16. The handle 15a of the main mechanism 14 then remains in a stable position $P_2$.

To move the handle 15a from the stable position $P_2$ to the unstable position $P_3$, the operator needs to deliberately apply a force on this handle 15a. If the pressure applied on the handle 15a is released, the handle may automatically return into position $P_2$, for example due to a return spring (not shown). Note that a mechanical system (not shown) of the linkage type is connected firstly to handle 15a and secondly to the hinge pin of the articulated arm 30 of the disengagement means 28 of at least one emergency locking mechanism 28.

Thus, when the handle 15a is moved from position $P_2$ to position $P_3$, the linkage type mechanical system activates the articulated arm(s) 30 connected to the handle 15a, thus activating the disengagement means and pivoting the articulated lever(s) 20b.

Consequently, when the handle 15a of the main locking mechanism 14 has reached position $P_3$, the articulated levers 20b and the hooks 20a of the mechanisms 16 are all disengaged, such that the operator can open the cowls 6 and 8.

Obviously, the complete set of emergency locking mechanisms 16 must be disengaged before the cowls 6 and 8 can be opened. Several configurations can be adopted in order to achieve this function.

For example, firstly it would be possible to connect each emergency locking mechanism 16 to the nearest main mechanism 14. Another possibility would be to form a single link between a single emergency mechanism 16 and any one of the main mechanisms 14 forming the closing system 12. In this case, means are necessary for fixing the hinge pins 22 of each articulated lever 20b so that pivoting either of them would also pivot the articulated levers 20b of all the emergency locking mechanisms 16. This solution will be preferred to the extent that the handle 15a of a single main mechanism 14 needs to be kept in position $P_3$ to enable opening of the cowls 6 and 8, and the other handles 15a can remain in their stable position $P_2$. Only one operator is necessary to control the movement of the cowls 6 and 8 from an open position to a closed position.

Furthermore, a large handle 15a can be provided for the main mechanisms 14 to provide a long lever arm for an operator opening or closing these mechanisms 14.

The preferred embodiment of this invention described above applies to application of the closing system 12 to an engine pod 1. However, note that the closing system 12 according to the invention could also be applied in any other type of assembly comprising two elements that can be in an open position in which they are separated from each other, or a closed position in which they are in contact with each other through a closing system comprising one or several locking mechanisms.

Obviously, those skilled in the art could make various modifications to the closing system 12 described above as a non-restrictive example only.

The invention claimed is:

1. Closing system interposed between two fan cowls of an aircraft engine pod that can occupy an open position and a closed position with respect to each other, the system comprising:
    at least one main locking mechanism, and
    at least one emergency locking mechanism that is automatically engaged when the two fan cowls are moved from the open position to the closed position, the at least one emergency locking mechanism capable of being activated when the at least one main locking mechanism is not locked, the at least one emergency locking mechanism includes a first and a second complementary shaped parts, installed on a first and a second of the two fan cowls respectively, wherein said at least one main locking mechanism comprises a first part and a second part installed on the first and second of the two fan cowls, respectively, said first part for engaging said second part, wherein the first part is a hook coupled to the first of said two fan cowls and the second part is a lever hinged on the second of the two fan cowls.

2. Closing system according to claim 1, characterized in that each emergency locking mechanism are activated when the two fan cowls move from the closed position towards the open position.

3. Closing system according to claim 1, characterized in that the hinged lever is coupled to mechanical return means configured to maintain the hook and the hinged lever engaged to each other.

4. Closing system according to claim 1, characterized in that the at least one emergency locking mechanism is coupled to disengagement means.

5. Closing system according to claim 1, characterized in that the at least one main locking mechanism is a quick fastening mechanism.

6. Closing system according to claim 1, characterized in that at least one guide pin is located proximal to the at least one emergency locking mechanism.

7. Closing system according to claim 1, characterized in that the at least one main locking mechanism comprises a handle configured to disengage the at least one emergency locking mechanism.

8. Closing system according to claim 1, wherein the at least one emergency locking mechanism further comprises a plurality of emergency locking mechanisms, wherein at least one of the plurality of emergency locking mechanism are located on lateral portions of the fan cowls.

* * * * *